June 18, 1935.  C. D. KOSKI  2,005,191
MOLECULAR WEIGHT INDICATOR
Filed March 30, 1933   2 Sheets-Sheet 2
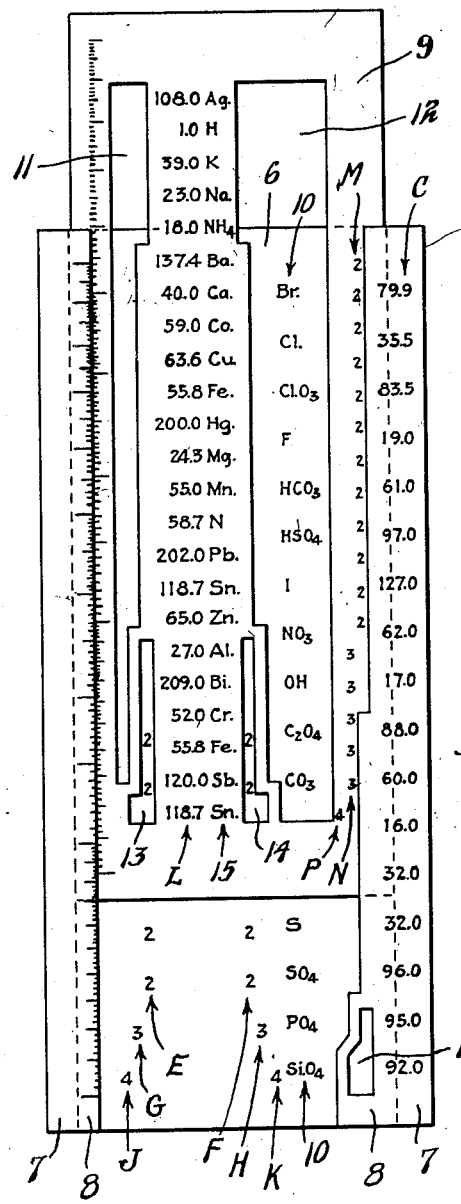
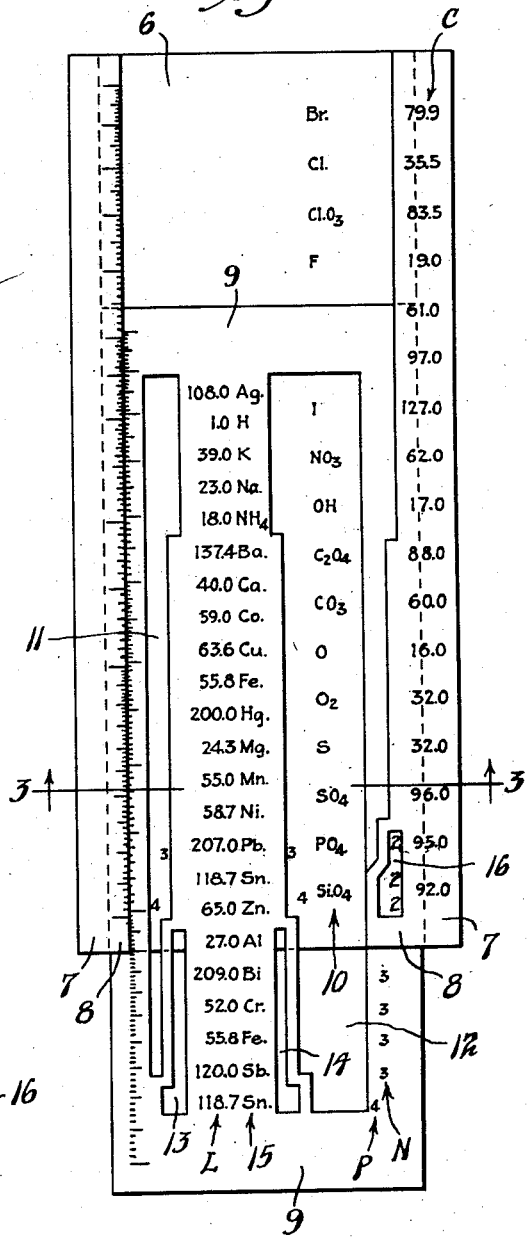
Inventor
Carlo D. Koski
By his Attorneys
Williamson & Williamson Patented June 18, 1935

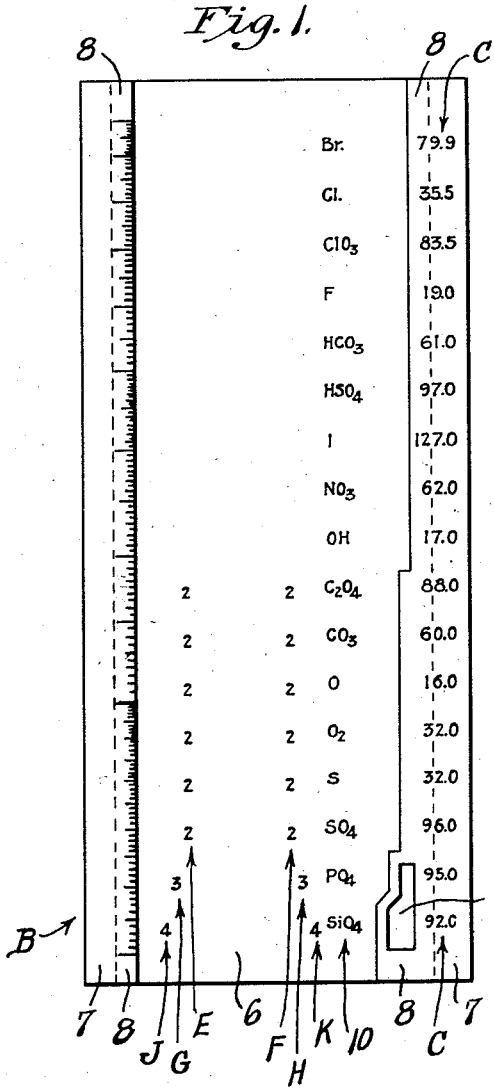
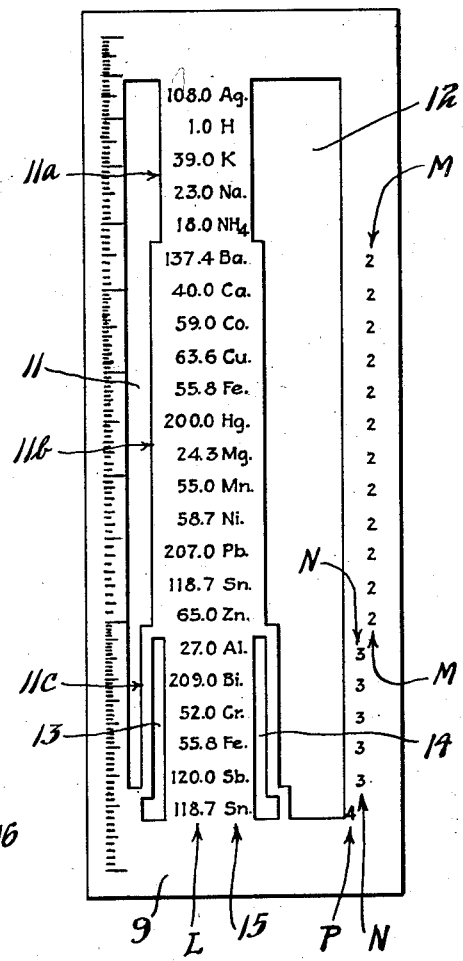

2,005,191

UNITED STATES PATENT OFFICE 2,005,191

MOLECULAR WEIGHT INDICATOR

Carlo D. Koski, Brainerd, Minn.

Application March 30, 1933, Serial No. 663,461

4 Claims. (Cl. 40—65)

My invention relates to indicators of the slide-rule type and particularly to indicators for determining the molecular weights of chemical compounds.

Ordinarily more or less cumbersome methods are employed in determining the molecular weights of chemical compounds. One method used is that of finding the specific compound under consideration in extensive tables of chemical data and then finding the molecular weight of that compound in the proper column of the table. This method obviously depends upon having at hand books containing suitable tables of chemical data and requires searching through many pages of such books to find the data pertaining to the specific compound under consideration. Another method consists of finding the atomic weights of all of the individual elements included in the compound, setting up of the correct formula for the compound, and then performing a series of arithmetical operations the number of which depends upon the complexity of the compound. This method obviously depends upon availability and use of tables of chemical data and is relatively slow and laborious.

It is an object of my invention to provide an indicator by means of which the molecular weights of various chemical compounds may be rapidly and conveniently determined without reference to tables of chemical data and with a minimum of arithmetical work.

Another object is to provide such an indicator by means of which the correct chemical formulas of various compounds may be determined.

Still another object is to provide an indicator comprising one member slidable with respect to another whereby the indicator may be set to show the formula of a compound under consideration and the numerical data from which the molecular weight of that compound may be determined.

A further object is to provide such an indicator of simple, rugged, and inexpensive construction which is adapted for rapid and convenient use.

These and other objects and advantages of the present invention will more fully appear from the following description, made in connection with the accompanying drawings, wherein like reference characters refer to the same or similar parts throughout the various views and, in which, Fig. 1 is a front view of the outer member of my indicator;

Fig. 2 is a front view of the inner member of my indicator;

Fig. 3 is a cross-sectional view of my indicator;

Fig. 4 is a front view of my indicator set to show information concerning a chemical compound; and Fig. 5 is a front view of my indicator set to show information concerning a second chemical compound.

Referring to the drawings, the outer portion or body B of my indicator, in the embodiment shown, consists of a rectangular back 6 carrying raised or forwardly protruding portions 7 along the longitudinal edges thereof with flanges 8 extending inwardly from the raised portions 7 in slightly spaced relation to the front side of the back 6. The front surfaces of the raised portions 7 and the flanges 8 are flush.

The inner or slide portion 9 consists of a rectangular piece of a length substantially the same as that of the back portion 6 and of a width slightly less than the distance between the inner edges of the raised portions 7.

The back 6 and the slide 9 are both constructed of relatively stiff, preferably opaque sheet material. The raised portions 7 and the flanges 8 of the back 6 may be constructed integrally with the back and constitute guides for the slide 9.

The slide 9 is placed in longitudinally slidable relation with the body B with its longitudinal edge portions confined between the flanges 8 and the portions of the back 6 located behind the respective flanges 8. The slide 9 is restrained from transverse movement with respect to the body B by the engagement of its longitudinal edges with the inner sides of the raised portions 7 of the body B. Obviously, the slide 9 is free for longitudinal sliding movement with respect to the body B.

Hereinafter the terms right, left, top, bottom, etc., will be used to indicate portions of my indicator as viewed in Figs. 1, 2, 4 and 5 of the drawings.

Between the inner or free edge of the right hand flange 8 and the longitudinal center line of the back 6 of the body B is printed or otherwise marked a column 10 of symbols representing negative ions or radicals, such as Br (for bromium), Cl (for chlorine), ClO₃ (for chlorate), etc., as shown in Fig. 1.

On the right hand guide flange 8 is placed a vertical column C of numerals, each numeral being horizontally aligned with one of the symbols of the column 10 and representing the sum of the atomic weights of the elements comprising the negative ion or radical represented by the symbol with which it is aligned.

The negative ions whose symbols appear in the upper portion of the column 10 down to and including OH all have a valence of one. The negative ions from $C_2O_4$ to $SO_4$, inclusive, all have a valence of two. $PO_4$ has a valence of three and $SiO_4$ has a valence of four. As shown in Fig. 1, the back 6, in its lower left hand portion, is provided with a spaced pair of vertically arranged columns E and F, each consisting of a numeral 2 horizontally aligned with each of the negative ions having a valence of two. Below the lower ends of the columns E and F, a pair of numerals 3 appear as at G and H, horizontally spaced slightly farther apart than the columns E and F and horizontally aligned with the symbol $PO_4$, which represents a negative ion having a valence of three. Below the numerals at G and H, are a pair of numerals 4 at J and K, respectively, horizontally spaced apart slightly more than the numerals at G and H, and horizontally aligned with the symbol $SiO_4$ which represents a negative ion having a valence of four.

The slide 9 is provided with a vertical column 15 of symbols representing certain positive ions such as Ag (silver), H (hydrogen), K (potassium), etc. Immediately to the left of the column 15, is a vertical column L of numerals, each numeral being horizontally aligned with one of the symbols in the column 15 and representing the atomic weight of the ion identified by that symbol.

The positive ions identified by the symbols Ag to $NH_4$, inclusive, have a valence of one, the positive ions Ba to Zn, inclusive, have a valence of two, the positive ions Al to Sb, inclusive, have a valence of three, and the positive ion Sn has a valence of four. A vertically disposed column M of numerals 2 is located on the slide 9 near the right hand edge thereof, each of the numerals 2 being horizontally aligned with one of the symbols in column 15 representing positive ions having a valence of two. A vertically disposed column N of numerals 3 is located below and somewhat to the left of the column M, each of the numerals 3 being horizontally aligned with one of the symbols in column 15 representing positive ions having a valence of three. Below and somewhat to the left of the column N is printed the numeral 4 located at P on the drawings and horizontally aligned with the symbol Sn in column 15, representing the positive ion, tin, which has a valence of four.

Portions of the slide 9 are cut away to provide longitudinally disposed viewing apertures, as shown in Fig. 2 at 11, 12, 13 and 14. The aperture 13, located in the left hand portion of the slide 9, has a straight left hand side.

The right hand side of the aperture 11 in the portion 11a thereof, adjacent symbols in column 15, representing ions having a valence of one, is so located that the upper portion of the aperture 11 will expose the numerals 2 of the column E, when aligned therewith. The medial portion 11b of the right hand side of the aperture 11, adjacent symbols in column 15, representing ions having a valence of two, is somewhat reduced in width and so located that the medial portion will expose the numeral 3 at the point G, when aligned therewith, but will cover or obscure the numerals 2 of column E. The lower portion 11c of the right hand side of the aperture 11, adjacent symbols in column 15, representing ions having a valence of three, is further reduced in width and so located that the lower portion of the aperture 11 will expose the numeral 4 at the point J when aligned therewith, but will obscure both the numerals 2 of the column E and the numeral 3 at the point G.

The left hand side of the aperture 12 is of a shape symmetrical with respect to the shape of the right hand side of the aperture 11, as shown in Fig. 2. The left hand side of the aperture 12 bears a relation to the column F and the numerals at points H and K similar to the relation of the right hand side of the aperture 11 to the column E and the numerals at points G and J.

The aperture 13, as shown in Fig. 2, consists of a slot aligned with the column E in the portion of the aperture adjoining the symbols in column 15, which represent ions having a valence of three and being widened at its lower end adjoining the symbol Sn in column 15 to include a portion vertically aligned with the numeral 3 at point G. The aperture 14 is symmetrically located and shaped with respect to the aperture 13.

The free edge of the right flange 8 of body 6 is cut away in portions or stepped to co-operate with the numerals in valence columns M and N and the numeral at point P. The portion of this edge adjoining the portion of the column C, pertaining to ions having a valence of one, is vertically aligned with a point just to the right of the column M. The portion adjoining the portion of the column C pertaining to ions having a valence of two is vertically aligned with a point located horizontally between the valence columns M and N. The portion adjoining the symbol $PO_4$ is aligned with a point located horizontally between the valence column N and the numeral at P. The portion adjoining the symbol $SiO_4$ is aligned with a point located at the left of the numeral at point P.

A viewing aperture 16 is formed in the lower portion of the flange 8, as shown in Fig. 1. The portion of the aperture aligned horizontally with the symbol $PO_4$ consists of a slot aligned with the valence column M. The portion horizontally aligned with the symbol $SiO_4$ is widened to be aligned with both of the valence columns M and N.

On the left hand one of the flanges and the left hand marginal portion of the slide, are, respectively, located graduations and indicia for use in the manner commonly employed in operating a slide-rule.

Operation

To obtain the molecular weight and the correct formula of a chemical compound by means of my indicator, the slide 9 is so placed that the symbol in column 15 of the slide and the symbol in column 10 of the body, representing, respectively, the positive and negative ions comprising the compound under consideration, are horizontally aligned. The correct formula will then appear between the column L and column C.

In compounds where the valences of the positive and negative ions therein are not alike, a numeral in column F or one of the numerals at H or K appears in the correct formula as a subscript for the positive ion and a numeral in column M or column N or the numeral at P appears as the subscript for the negative ion. In cases where the valences of the positive and negative ions of a compound are alike, no subscript numeral will appear.

The molecular weight is found by multiplying the atomic weight in column L (aligned with the formula) by the numeral, if any, appearing at the left of this atomic weight, then multiplying the aggregate atomic weight in column C (aligned with the formula) by the numeral, if any, appearing immediately to its left, and adding together the two products.

For example, if it is desired to determine the correct formula and the molecular weight of a compound comprising calcium (Ca) and bromide (Br), the slide 9 is so adjusted that the symbol Ca thereon is horizontally aligned with the symbol Br on the back 6, as shown in Fig. 4. The correct formula is shown to be $CaBr_2$. No numeral appears at the left of the atomic weight, 40 of calcium (found in column L), so this atomic weight is not multiplied by any factor or multiplier. The numeral 2 appears at the left of the atomic weight, 79.9, of bromine (found in column C) so 79.9 is multiplied by 2 to give 159.8. Adding 40 and 159.8 gives 199.8 which is the molecular weight $CaBr_2$.

If it is desired to determine the correct formula and the molecular weight of a compound comprising, for example, lead (Pb) and the phosphate ion ($PO_4$), the slide 9 is so adjusted that the symbol Pb thereon is horizontally aligned with the symbol $PO_4$ on the back 6, as shown in Fig. 5. The correct formula is shown to be $Pb_3(PO_4)_2$. The atomic weight of lead, 207, appearing in column L, is multiplied by 3, which appears at its left to give 621 and the atomic weight of the phosphate ion, 95 appearing in column C is multiplied by 2, which appears at its left, to give 190. The sum of 621 and 190 equals 811 which is the molecular weight of the compound $Pb_3(PO_4)_2$.

With further reference to Fig. 5, it will be noted that protruding portions of the right hand flange 8 conceal the numerals in column M except for those numerals exposed by means of the aperture 16 and also that the uppermost numeral of column N is concealed.

It is obvious that my indicator may be readily constructed to include a smaller or greater number of positive and negative ions than the embodiment described and that the parts of the indicator may be constructed for relative movement other than rectilinear.

It is apparent that I have invented a simple, rugged, inexpensive, and rapidly and conveniently operable form of indicator for determining the molecular weights and correct formulas for various chemical compounds.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What I claim is:

1. In an indicating device, a body, a member connected with said body for movement relatively thereto, two series of symbols located respectively on said body and said movable member, symbols in one of said series representing certain data and symbols in the other series representing certain other data, said members each having thereon a series of numerals representing numerical data related to the symbols thereon, and alined with the corresponding symbols, a second series of numerals on each of said members positioned in each instance adjacent an edge of the other member, said last mentioned edges of said members having protruding portions extending generally in the direction of the arrangement of said second series of numerals and serving to cover certain of said numerals in various relatively adjusted positions of said two members, substantially as and for the purposes described.

2. In an indicating device, a body, a member connected with said body for movement relatively thereto, two series of symbols located respectively on said body and said movable member, symbols in one of said series representing certain data, and symbols in the other series representing certain other data, said members each having thereon a series of numerals representing numerical data pertaining to the symbols thereon and alined with the corresponding symbols, a second series of numerals on each of said members alined with certain of said symbols on the respective members, the arrangement of certain of said second series of numerals being displaced from the arrangement of certain other of said second series of numerals and at least one of said members having an aperture extending in a direction of movement of said members for exposing certain of said second series of numerals on the other member in certain relatively adjusted positions of said members.

3. An indicating device comprising a body member and a slide member connected therewith for longitudinal adjustment relative thereto, one of said members having a longitudinally arranged series of characters disposed adjacent one of the longitudinal edges of the second member, said longitudinal edge having a protruding portion extending in the direction of movement of said slide and arranged and constructed to cover and obscure some of said characters in said series in certain adjusted positions of said members and to expose certain characters in other adjusted positions of said members.

4. In a device for indicating the relation between a datum of one series of data and a datum of another series of data comprising two members one of which is superimposed upon the other in slidable relation thereto, said superimposed member having a plurality of stepped protruding portions adapted to cover certain indicia on the other member and movable with said superimposed member to expose certain of such indicia in certain positions of one of said members relative to the other and said superimposed member having at least one viewing recess therein adapted to expose certain other of said indicia in certain positions of one of said members relative to the other.

CARLO D. KOSKI.